United States Patent
Sung et al.

(10) Patent No.: US 11,750,000 B2
(45) Date of Patent: Sep. 5, 2023

(54) ELECTRONIC DEVICE HAVING USB POWER DELIVERY FUNCTION

(71) Applicant: REALTEK SEMICONDUCTOR CORP., Hsinchu (TW)

(72) Inventors: Ya-Hsuan Sung, Hsinchu (TW); Leaf Chen, Hsinchu (TW); Li-Cheng Chu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 121 days.

(21) Appl. No.: 17/526,303

(22) Filed: Nov. 15, 2021

(65) Prior Publication Data
US 2022/0166241 A1    May 26, 2022

(30) Foreign Application Priority Data
Nov. 23, 2020 (TW) ................. 109141021

(51) Int. Cl.
*H02J 7/00* (2006.01)
*H01R 13/703* (2006.01)
*H01R 13/66* (2006.01)

(52) U.S. Cl.
CPC ...... *H02J 7/00308* (2020.01); *H01R 13/6666* (2013.01); *H01R 13/7031* (2013.01); *H02J 7/0031* (2013.01)

(58) Field of Classification Search
CPC ................ H02J 7/00308; H02J 7/0031; H01R 13/6666; H01R 13/7031
USPC .......................................................... 361/18
See application file for complete search history.

(56) References Cited

U.S. PATENT DOCUMENTS

| | | | |
|---|---|---|---|
| 10,809,787 B2* | 10/2020 | Nayak | G06F 1/266 |
| 2017/0344508 A1* | 11/2017 | Setiawan | G06F 13/4022 |
| 2021/0089100 A1* | 3/2021 | Nayak | G06F 1/266 |

* cited by examiner

*Primary Examiner* — Yemane Mehari
(74) *Attorney, Agent, or Firm* — Birch, Stewart, Kolasch & Birch, LLP

(57) ABSTRACT

An electronic device having a universal serial bus (USB) power delivery function includes a connector, an electrostatic discharge (ESD) protection circuit, a power reception notification circuit, and a control circuit. The connector is coupled to a USB host. The connector includes a configuration channel (CC) pin. The power reception notification circuit is configured to turn on, in response to an enable signal, a pull-down path of a pull-down circuit of the ESD protection circuit. The configuration channel pin generates a pull-down voltage through the pull-down path of the pull-down circuit when the pull-down path is turned on. The control circuit is configured to send the enable signal to the power reception notification circuit when a trigger signal that meets a power reception condition is detected. The control circuit controls the connector to draw power from the USB host when the pull-down voltage of the connector is greater than a pull-down threshold.

17 Claims, 5 Drawing Sheets

ELECTRONIC DEVICE HAVING USB POWER DELIVERY FUNCTION

CROSS-REFERENCE TO RELATED APPLICATION

This non-provisional application claims priority under 35 U.S.C. § 119(a) to Patent Application No. 109141021 filed in Taiwan, R.O.C. on Nov. 23, 2020, the entire contents of which are hereby incorporated by reference.

BACKGROUND

Technical Field

The present invention relates to a universal serial bus (USB) technology, and in particular, to an electronic device having a USB power delivery function.

Related Art

A USB interface has advantages of hot plugging and plug-and-play, and power supply or power reception can also be performed by using a USB interface. With the development of technologies, the version of the USB has been updated constantly, and when updated to the USB-C version, the USB has been developed to allow an electronic device having a USB connector to enable, according to a status of the electronic device or a status of another electronic device connected to the USB connector, the USB connector to quickly switch between a power supply role and a power reception role. Generally, the function is referred to as fast role swap (FRS). To make the electronic device to determine whether to execute an FRS program, a pull-down signal is generally sent by using a configuration channel (CC) of the USB connector, so that when detecting the pull-down signal, a device connected to the USB connector executes the FRS program.

Because a CC of a USB connector is an external connection interface, static electricity may be generated. Therefore, a CC is generally coupled to (for example, electrically connected in parallel to) an electrostatic discharge (ESD) protection circuit, and in addition to the ESD protection circuit, the CC is further coupled to a pull-down path for generating a pull-down signal during execution of an FRS program. Moreover, the pull-down path generally uses a plurality of resistors with large resistance values that are connected in parallel, to implement an electrostatic protection function when generating a pull-down signal. However, using a plurality of resistors with large resistance values that are connected in parallel may raise a design area of a circuit board.

SUMMARY

In view of the above, the present invention provides an electronic device having a USB power delivery function, so that when an FRS program is to be executed, a configuration channel pin may generate a pull-down voltage through a pull-down path, of an ESD protection circuit, that does not need to be coupled to a plurality of resistors with large resistance values that are connected in parallel. Therefore, the configuration channel pin can generate the pull-down voltage without an additional circuit, and also has an electrostatic protection function, and a design area of a circuit board can also be significantly reduced.

According to some embodiments, the electronic device having a USB power delivery function includes a connector, an ESD protection circuit, a power reception notification circuit, and a control circuit. The connector is coupled to a USB host. The connector includes a configuration channel pin. The ESD protection circuit is coupled to the configuration channel pin of the connector. The power reception notification circuit is coupled to the ESD protection circuit. The power reception notification circuit is configured to turn on, in response to an enable signal, a pull-down path of a pull-down circuit of the ESD protection circuit. The configuration channel pin generates a pull-down voltage through the pull-down path of the pull-down circuit when the pull-down path is turned on. The control circuit is coupled to the power reception notification circuit and the connector. The control circuit is configured to send the enable signal to the power reception notification circuit when a trigger signal that meets a power reception condition is detected, where the control circuit controls the connector to draw power from the USB host when the pull-down voltage of the connector is greater than a pull-down threshold.

Based on the above, according to some embodiments, when a power reception condition is met (for example, when a power from a power supply is cut off or a connected electronic device intends to be a power supply device), the configuration channel pin generates a pull-down voltage through a pull-down path, of an ESD protection circuit, that does not need to be coupled to a plurality of resistors with large resistance values that are connected in parallel, so that when the pull-down voltage is raised due to the connected electronic device (for example, a USB host), a connector draws power from the USB host, to complete an FRS program. In addition, because the pull-down voltage used by the configuration channel pin for executing the FRS program is generated by the pull-down path of a common ESD protection circuit, a design area of a circuit board can be significantly reduced.

DETAILED DESCRIPTION

Some words are used to refer to specific elements in this specification. A person of ordinary skill in the art should understand that, a hardware manufacturer may refer to a same element by using different terms. A difference in function of elements should be used as a standard for distinguishing between elements, and a difference in name should not be used as a way of distinguishing between elements. "Including" mentioned in this specification is an open term, and therefore should be explained as "including, but not limited to". In addition, the term "coupled" used herein includes any direct and indirect electrical connection means. Therefore, if a first apparatus is coupled to a second apparatus as described in this specification, it represents that the first apparatus may be directly electrically connected to the second apparatus, or may be indirectly electrically connected to the second apparatus by using other apparatuses or connection means.

Figure 1:
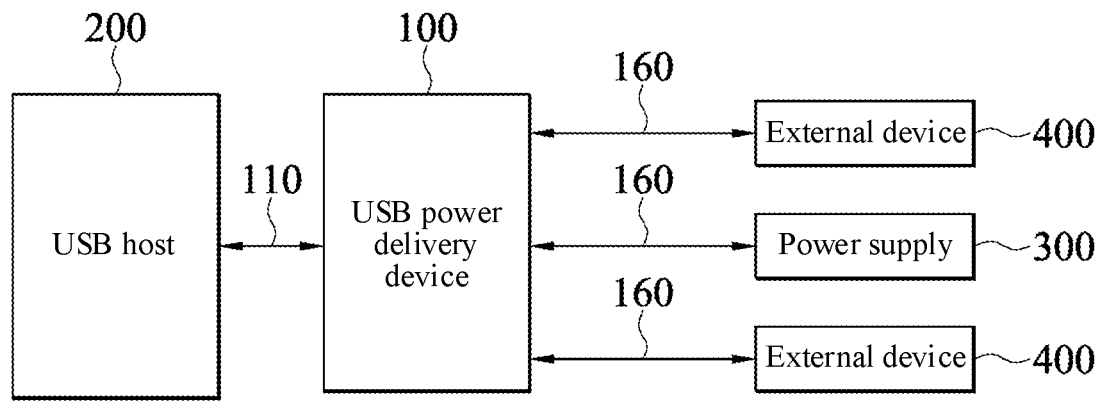
FIG. 1 illustrates a schematic block diagram of a USB power delivery device and a circuit applied thereto according to some embodiments.

FIG. 1 illustrates a schematic block diagram of a USB power delivery device 100 and a circuit applied thereto according to some embodiments. An electronic device having a USB power delivery function (hereinafter referred to as a USB power delivery device 100 for convenience of description) is adapted to be connected to a USB host 200. The USB host 200 may be, but not limited to, an electronic device (for example, a device that can supply power or receive power) that has a USB connector and supports an FRS function, for example, a personal computer and a mobile digital television (such as a set-top box).

In some embodiments, the USB power delivery device 100 is adapted to be connected between the USB host 200 and at least one external device 400. In FIG. 1, an example in which the USB power delivery device 100 is connected to two external devices 400 is used, but the present invention is not limited thereto. The USB power delivery device 100 may be connected to one external device 400 or more than two external devices 400.

The external device 400 may be, but not limited to, a device that only receives power (or an electronic device that does not support an FRS function), for example, an audio device, a USB communication and control (CDC) device (such as a network interface card, a data machine, and a serial port), a human interface device (such as a keyboard and a mouse), a physical interface device (such as a joystick), an static image capturing device (such as an image scanner), a printing device (printer), a mass storage device (such as a flash drive, a removable hard disk, a memory card, and a digital camera), a hub (USB hub), a communication device (CDC-Date, such as a data machine and a fax), a smart card device (such as a card reader), a video device (such as a network camera), an audio/video (AV) interface (such as a television), or a wireless transmission device (wireless controller, such as Bluetooth).

In some embodiments, the USB power delivery device 100 is adapted to be connected between the USB host 200 and a power supply 300. In FIG. 1, an example in which the USB power delivery device 100 is connected to one power supply 300 is used, but the present invention is not limited thereto. The USB power delivery device 100 may be connected to a plurality of power supplies 300. The power supply 300 may be, for example, but not limited to, a device that only supplies power (or an electronic device that does not support an FRS function), for example, a power adapter. In some embodiments, the USB power delivery device 100 is adapted to be connected between the USB host 200 and a power supply 300 and at least one external device 400.

Referring FIG. 1 again, the USB power delivery device 100 includes a USB connector (hereinafter referred to as a connector 110) on one end and at least one connection port 160 on another end. The connector 110 is connected to the USB host 200. The connection port 160 is connected to the external device 400 and the power supply 300. A version of the connector 110 corresponds to the USB host 200, and the connection port 160 corresponds to types of connectors of the external device 400 and the power supply 300. A type of a connector of the external device 400 may be, but not limited to, various USB versions, an audio jack plug, a video connector (such as an HDMI or RS285), and the like. A type of a connector of the power supply 300 may be, but not limited to, various USB versions, a power adapter connector, and the like. In some embodiments, the USB power delivery device 100 is a device that supports an FRS function and that has a USB connector, and is, for example, but not limited to, a USB hub, a personal computer, a mobile device, photographic equipment, a digital television (such as a set-top box), or a game console. In some embodiments, the USB power delivery device 100 is configured to convert a USB interface and another communication interface. In some embodiments, the USB power delivery device 100 is configured to extend a USB interface (extend a single USB interface into a plurality of USB connection ports). In some embodiments, the USB power delivery device 100 is configured to convert a USB interface and another communication interface, to extend a USB interface.

Figure 2:
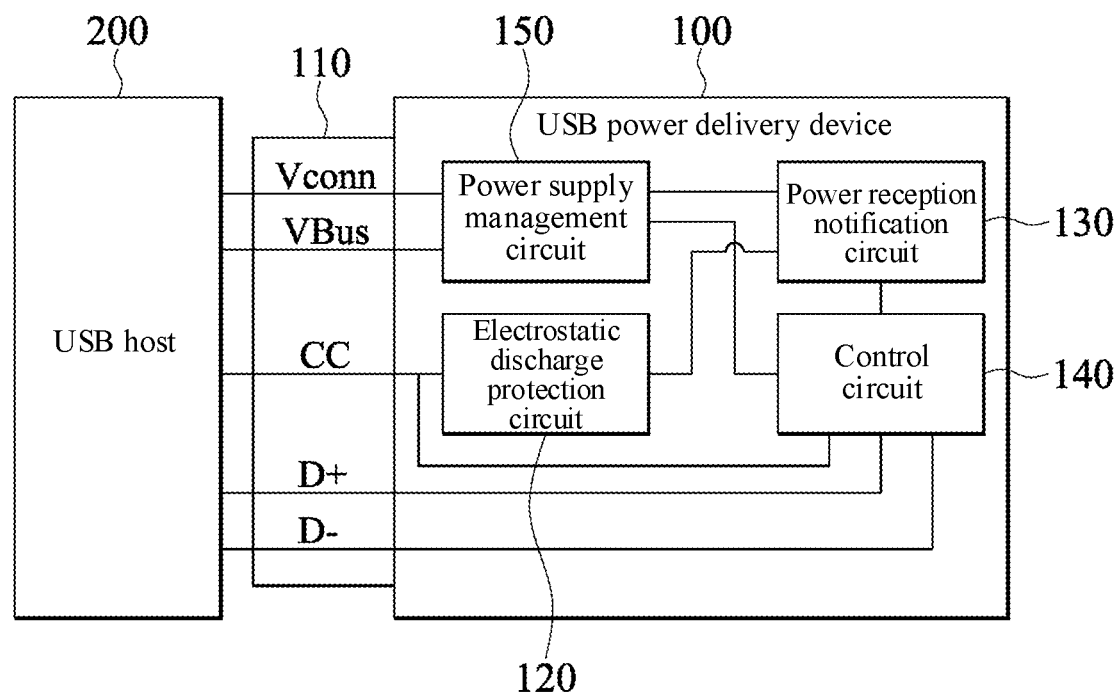
FIG. 2 illustrates a schematic block diagram of a USB power delivery device and a circuit applied thereto according to some embodiments.

FIG. 2 illustrates a schematic block diagram of a USB power delivery device 100 and a circuit applied thereto according to some embodiments. the USB power delivery device 100 includes a connector 110, an ESD protection circuit 120, a power reception notification circuit 130, and a control circuit 140. The connector 110 is coupled to a USB host 200. The ESD protection circuit 120 is coupled to the connector 110. The power reception notification circuit 130 is coupled to the ESD protection circuit 120. The control circuit 140 is coupled to the connector 110 and the power reception notification circuit 130. In some embodiments, the ESD protection circuit 120 is coupled to a configuration channel pin CC of the connector 110.

The connector 110 is a USB connector that matches the USB host 200, and the connector 110 includes a configuration channel pin CC. When the USB host 200 is connected to the connector 110, the USB host 200 and pins of the connector 110 of the USB power delivery device 100 form electrical connections. In the embodiment in FIG. 2, there are five electrical connections between the USB host 200 and the pins of the connector 110 of the USB power delivery device 100. According to a definition of the USB version in FIG. 2 (a USB-C is used as an example herein), the pins of the five electrical connections are respectively a direct power supply pin Vconn, a converter power supply pin VBus, a data pin D+, a data pin D−, and a configuration channel pin CC. Therefore, when a state of a connection between the USB power delivery device 100 and the USB host 200 is a "stable state" (for example, after a period of time, one of the USB power delivery device 100 and the USB host 200 has been stably supplying power or has been stably transmitting data to the other), the USB power delivery device 100 may perform data transmission with the USB host 200 by using the data pin D+ and the data pin D− (for example, the control circuit 140 receives and processes a data signal from the USB host 200 by using the data pin D+ and the data pin D−, or the control circuit 140 sends a data signal to the USB host 200 by using the data pin D+ and the data pin D−), and may draw power from the USB host 200 or supply power to the USB host 200 by using the direct power supply pin Vconn and the converter power supply pin VBus. In some embodiments, if the USB power delivery device 100 draws power from the USB host 200, the direct power supply pin Vconn draws a power supply that is directly supplied by a battery of the USB host 200, and the converter power supply pin VBus draws power that is supplied by the USB host 200 and that is different from the battery power supply, for example, power outputted by a power supply module of the USB host 200. In some embodiments, if the USB power delivery device 100 supplies power to the USB host 200, the direct power supply pin Vconn supplies power to the USB host 200 from a battery (not shown) of the USB power delivery device 100, and the converter power supply pin VBus supplies power that is different from the battery power supply of the USB power delivery device 100 to the USB host 200, for example, power outputted by a power supply module (not shown) of the USB power delivery device 100.

The ESD protection circuit 120 is configured to protect a pin of the connector 110 of the USB power delivery device 100, so that the pin of the connector 110 and a circuit coupled to the pin will not be burnt out due to static electricity. For example, when the configuration channel pin CC has static electricity, the ESD protection circuit 120 quickly discharges the static electricity, to protect the configuration channel pin CC and a circuit coupled to the configuration channel pin CC. In some embodiments, pins of the connector 110 (for example, a direct power supply pin Vconn, a conversion power supply pin VBus, a data pin D+, a data pin D−, and a configuration channel pin CC) are each connected to one ESD protection circuit 120 in parallel (that is, in this case, the USB power delivery device 100 includes a plurality of ESD protection circuits 120), to protect the pins from being burnt out due to impact of static electricity. The ESD protection circuit 120 may be implemented by a circuit, including an active or passive electronic element such as a diode, an inductor, a capacitor, or a resistor and configured to protect the pin of the connector 110 from impact of static electricity, for example, a ESD protection module circuit.

Descriptions are made by using an example in which the USB power delivery device 100 has been stably supplying power to the USB host 200. The control circuit 140 is configured to detect a trigger signal, and sends an enable signal to the power reception notification circuit 130 when the trigger signal meets a power reception condition. For example, the control circuit 140 detects a trigger signal periodically (for example, periodically performing detection according to a clock signal) or in real time, and when the trigger signal meets a power reception condition (for example, the trigger signal is generated because a power reception condition is met), that is, when the USB power delivery device 100 intends to switch from supplying power to the USB host 200 to receiving power from the USB host 200 (that is, perform an FRS function to switch from a power supply role to a power reception role), sends an enable signal to the power reception notification circuit 130, to enable the power reception notification circuit 130. The enable signal may be a level signal, for example, a high-level signal or a low-level signal. In some embodiments, the control circuit 140 is, for example, but not limited to, an operation circuit such as a central processing unit, a microprocessor, an application-specific integrated circuit (ASIC), or a system on a chip (SOC).

The power reception notification circuit 130 is configured to turn on, in response to the enable signal, a pull-down path PDD of a pull-down circuit 1203 of the ESD protection circuit 120. The configuration channel pin CC generates a pull-down voltage through the pull-down path PDD of the pull-down circuit 1203 when the pull-down path PDD is turned on. Specifically, the configuration channel pin CC generates a pull-down voltage of a low voltage level by using a pull-down resistor provided by the pull-down path PDD of a pull-down circuit 1203, for the USB host 200 to learn that the USB power delivery device 100 intends to switch from supplying power to the USB host 200 to receiving a power from the USB host 200 so that the USB host 200 can perform a corresponding action (for example, the USB host 200 starts to raise the voltage level of the configuration channel pin CC, so that after learning that the USB host 200 can start to supply power, the USB power delivery device 100 starts to draw power from the USB host 200). The pull-down voltage is a low voltage level, for example, close to zero volt (such as 0.1 volts) or zero volt. The pull-down resistor may be a resistor with a small resistance value, for example, a resistor less than five ohm. In some embodiments, the power reception notification circuit 130 may be implemented by a circuit, including an active or passive electronic element such as a diode, an inductor, a capacitor, or a resistor and configured to turn on the pull-down path PDD of the pull-down circuit 1203 in a case that a power reception condition is met. In some embodiments, the pull-down circuit 1203 is a circuit that does not need to be coupled to a plurality of resistors with large resistance values that are connected in parallel and that is configured to generate a pull-down voltage (or configured for electrostatic protection).

When the pull-down voltage of the configuration channel pin CC of the connector 110 is greater than a pull-down threshold, the control circuit 140 controls the connector 110 to draw power from the USB host 200. For example, after the configuration channel pin CC generates the pull-down voltage, the control circuit 140 detects the voltage level of the configuration channel pin CC periodically (for example, periodically performs detection according to a clock signal) or in real time, and when the voltage level (that is, the pull-down voltage) of the configuration channel pin CC rises to be greater than the pull-down threshold due to the USB host 200, controls the connector 110 to draw power from the USB host 200. After learning that the USB power delivery device 100 intends to switch from supplying power to the USB host 200 to receiving power from the USB host 200, the USB host 200 raises the voltage level of the configuration channel pin CC in an electrical connection, so that the control circuit 140 of the USB power delivery device 100 may determine, by detecting the voltage level of the configuration channel pin CC, whether the USB host 200 is ready to supply power, and when the voltage level of the configuration channel pin CC rises due to the USB host 200, determine that the USB host 200 is ready to supply power, and start to draw power from the USB host 200. The pull-down threshold may be determined according to a voltage value of the pull-down voltage that has not risen due to the USB host 200. For example, when the pull-down voltage does not rise and is 0.1 volts, the pull-down threshold may be 0.1 volts, but the present invention is not limited thereto.

In some embodiments, the configuration channel pin CC of the connector 110 raises the pull-down voltage by using a pull-up signal from the USB host 200, to draw the power from the USB host 200 when the pull-down voltage is greater than the pull-down threshold. For example, after learning that the USB power delivery device 100 intends to switch from supplying power to the USB host 200 to receiving power from the USB host 200, the USB host 200 sends a signal having a high voltage level (that is, the pull-up signal), to raise the voltage level (that is, the pull-down voltage) of the configuration channel pin CC, and when the pull-down voltage is greater than the pull-down threshold, the USB power delivery device 100 learns that the USB host 200 can start to supply power (for example, the control circuit 140 determines, according to a comparison result that is generated after a comparator (not shown) of the USB power delivery device 100 compares the pull-down voltage with the pull-down threshold, whether the USB host 200 can start to supply power, and learns that the USB host 200 can start to supply power when the comparison result is that the pull-down voltage is greater than the pull-down threshold), and starts to draw power from the USB host 200.

In some embodiments, the USB power delivery device 100 further includes a power supply management circuit 150, to receive, output, and manage power from a power supply 300 of the direct power supply pin Vconn, the conversion power supply pin VBus, and a connection port 160. Processing on received power and outputted power performed by the power supply management circuit 150 depends on the USB host 200, an external device 400, and the power supply 300, and may be, but not limited to, voltage stabilization, voltage bucking, and/or voltage boosting. The power supply management circuit 150 may be implemented by a circuit, including an active or passive electronic element such as a diode, an inductor, a capacitor, or a resistor and configured to manage a power supply, for example, a filter circuit and a power factor correction circuit.

In some embodiments, the power reception condition is that the trigger signal is a signal generated by the control circuit 140 when a pull-up signal sent from the USB host 200 is detected through the connector 110. For example, when the USB host 200 intends to switch from drawing power from the USB power delivery device 100 to supplying power to the USB power delivery device 100, or when the USB power delivery device 100 intends to switch from supplying power to the USB host 200 to drawing power from the USB host 200, the USB host 200 sends a pull-up signal (for example, a signal having a high voltage level) to raise the pull-down voltage of the USB power delivery device 100 or notify the USB power delivery device 100 that the USB host 200 intends to switch to a power supply role. When detecting a pull-up signal from the USB host 200 by using the configuration channel pin CC of the connector 110, the control circuit 140 generates a trigger signal.

Figure 3:
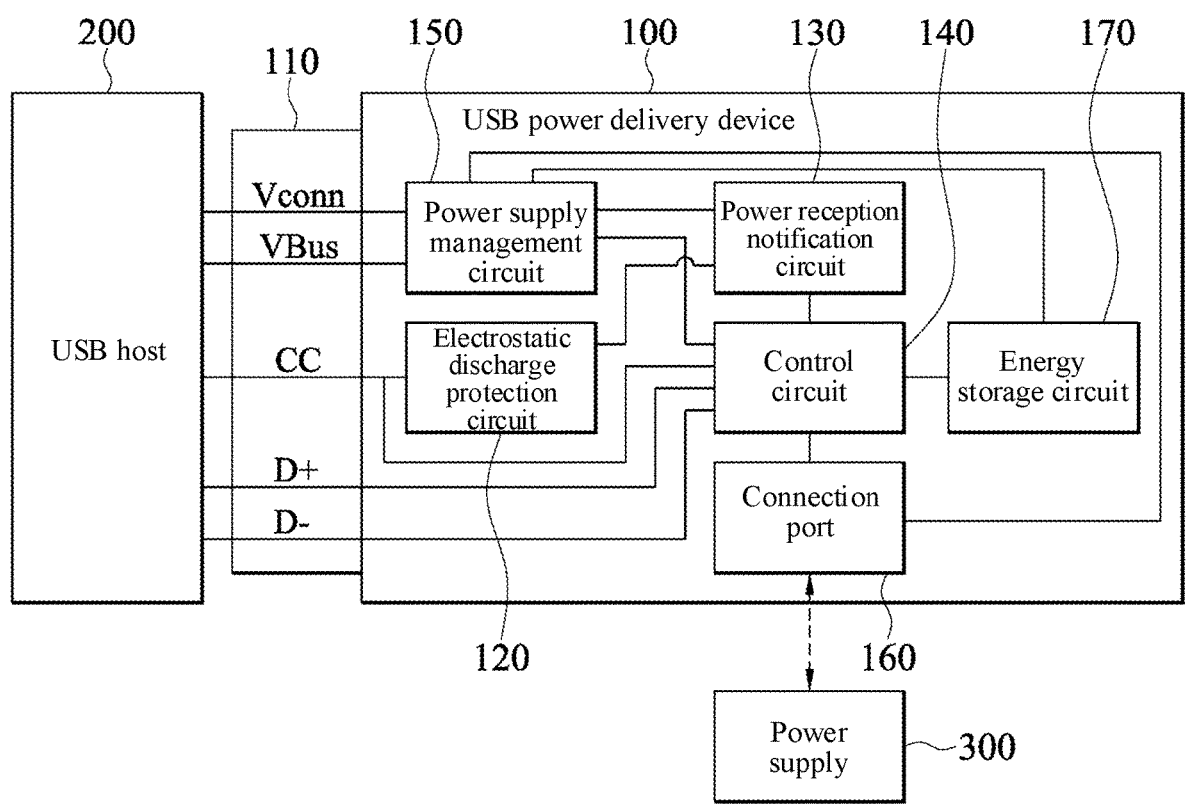
FIG. 3 illustrates a schematic block diagram of a USB power delivery device and a circuit applied thereto according to some embodiments.

FIG. 3 illustrates a schematic block diagram of a USB power delivery device 100 and a circuit applied thereto according to some embodiments. In some embodiments, the USB power delivery device 100 further includes at least one connection port 160. For convenience of description, merely one connection port 160 is drawn in FIG. 3, but the present invention is not limited thereto. The power reception condition is that the trigger signal is a signal generated by the control circuit 140 when it is detected that the connection port 160 does not receive the power supply 300. For example, the USB power delivery device 100 stably draws power from the power supply 300 (for example, a state of a connection between the USB power delivery device 100 and the power supply 300 is a connected state), the power supply management circuit 150 manages the drawn power, and distributes the power to the USB host 200 by using the connector 110. When the USB power delivery device 100 detects that the connection port 160 does not receive the power supply 300 (for example, a state of a connection between the USB power delivery device 100 and the power supply 300 switches from a connected state to an unconnected state), the USB power delivery device 100 cannot draw power from the power supply 300. Therefore, the control circuit 140 generates a trigger signal, for the USB power delivery device to switch from supplying power to the USB host 200 to drawing power from the USB host 200.

In some embodiments, the USB power delivery device 100 further includes an energy storage circuit 170, where the power reception condition is that the trigger signal is a signal generated by the control circuit 140 when it is detected that remaining energy of the energy storage circuit 170 is less than an energy threshold. The energy storage circuit 170 may be implemented by a circuit, including an active or passive electronic element such as a diode, an inductor, a capacitor, or a resistor and configured to store energy. For example, when the remaining energy of the energy storage circuit 170 is less than an energy threshold, the USB power delivery device 100 is caused to have insufficient energy (that is, power) to supply to the USB host 200. Therefore, the control circuit 140 generates a trigger signal (for example, the control circuit 140 determines, according to a comparison result of a comparator, whether the remaining energy is less than the energy threshold, and generates a trigger signal when the remaining energy is less than the energy threshold), for the USB power delivery device to switch from supplying power to the USB host 200 to drawing power from the USB host 200. The energy threshold may be determined according to total stored energy of the energy storage circuit 170. For example, the energy threshold may be 10% of the total stored energy of the energy storage circuit 170.

Figure 4:
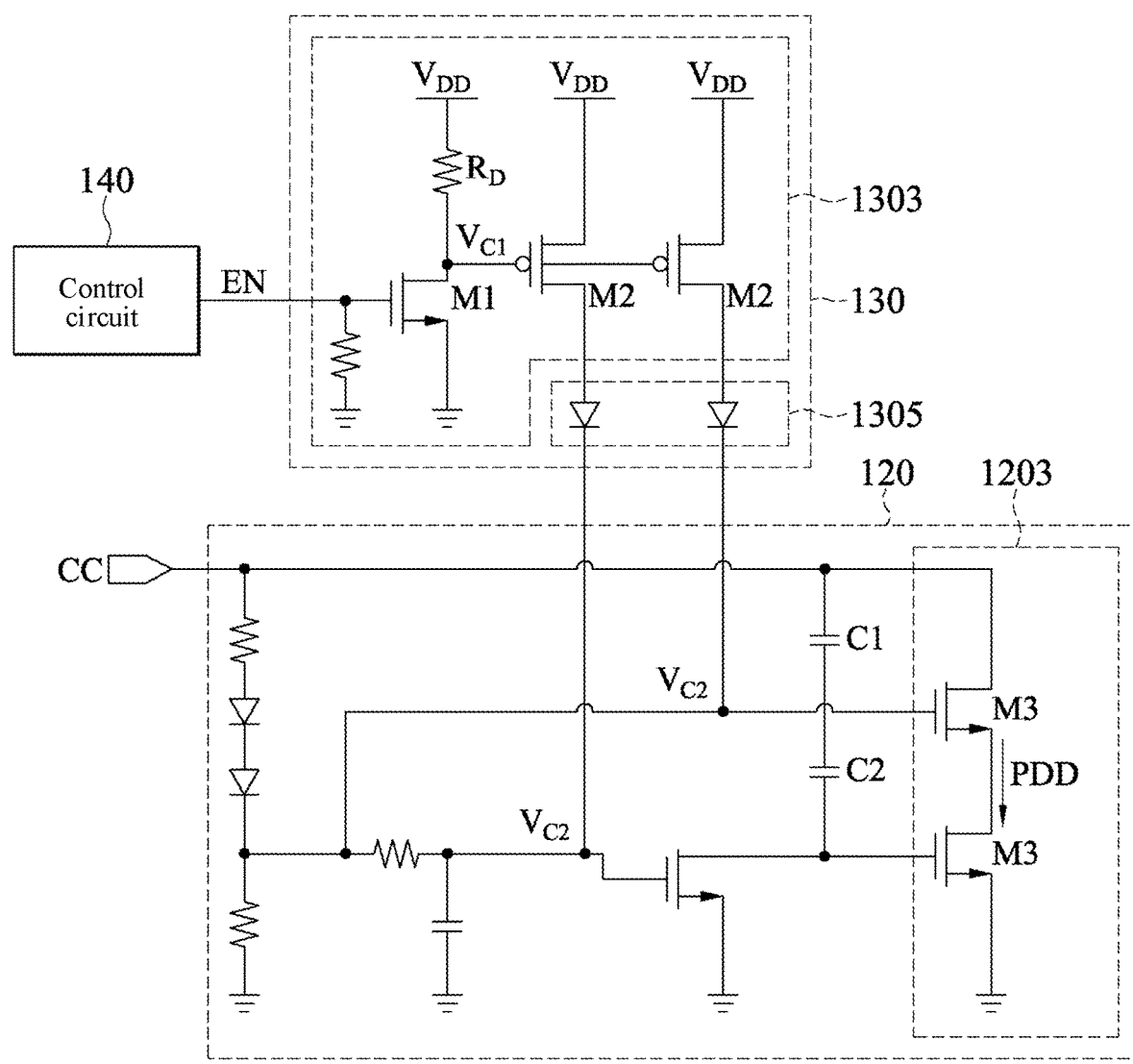
FIG. 4 illustrates a schematic circuit block diagram of a power reception notification circuit and an ESD protection circuit according to some embodiments.

FIG. 4 illustrates a schematic circuit block diagram of a power reception notification circuit 130 and an ESD protection circuit 120 according to some embodiments. In some embodiments, the power reception notification circuit 130 includes a drive circuit 1303 and an enable terminal EN. The enable terminal EN is coupled to the drive circuit 1303 and the control circuit 140. The drive circuit 1303 is coupled to the pull-down circuit 1203. The enable terminal EN responds to an enable signal, to enable the drive circuit 1303. The drive circuit 1303, when being enabled, turns on a pull-down path PDD of a pull-down circuit 1203. For example, the enable signal is a high-level signal, and after being enabled by the high-level signal, the drive circuit 1303 sends a voltage signal (for example, sends a voltage signal having a voltage value, and the voltage value is greater than a startup voltage for turning on the pull-down path PDD of the pull-down circuit 1203) to the pull-down circuit 1203, to turn on the pull-down path PDD.

In some embodiments, the drive circuit 1303 includes a first transistor M1 and at least one second transistor M2. The pull-down circuit 1203 includes at least one third transistor M3. In FIG. 4, two second transistors M2 and two third transistors M3 are used as an example, but the present invention is not limited thereto. There may be one or more than two second transistors M2 and third transistors M3. The first transistor M1 is coupled to an enable terminal EN. The at least one second transistor M2 is coupled to the first transistor M1. The at least one third transistor M3 is coupled to a configuration channel pin CC and the corresponding second transistor M2. The first transistor M1 generates a first control voltage $V_{C1}$ when being enabled by the enable terminal EN and turned on. The second transistor M2 generates a second control voltage $V_{C2}$ when being turned on according to the first control voltage $V_{C1}$. The third transistor M3 is turned on according to the second control voltage $V_{C2}$, to form the pull-down path PDD. For example, an example in which the first transistor M1 and the third transistor M3 are N-type transistors and the second transistor M2 is a P-type transistor is used. A gate of the first transistor M1 receives an enable signal from the enable terminal EN, and is conducting when the enable signal is at a high level (for example, being greater than 1 volt), to generate a first control voltage $V_{C1}$ at a drain; and a gate of the second transistor M2 receives the first control voltage $V_{C1}$, and is conducting when the first control voltage $V_{C1}$ is a low-level voltage (for example, being close to or being 0 volt), to generate a second control voltage $V_{C2}$ at a drain. A gate of the third transistor M3 receives the second control voltage $V_{C2}$, and is conducting when the second control voltage $V_{C2}$ is a high-level voltage (for example, being greater than 1 volt), so that the pull-down path PDD is formed between the conducting third transistor M3 and a reference ground terminal coupled to the third transistor M3, to enable the configuration channel pin CC to generate a pull-down voltage through the pull-down path PDD.

The first transistor M1, the second transistor M2, and the third transistor M3 are, for example, but not limited to, bipolar junction transistors (BJTs), field-effect transistors (FETs), and the like. In some embodiments, the third transistor M3 is an electrostatic protection transistor, and has relatively high voltage tolerance, so that it is unnecessary to connect in series or in parallel an additional resistor at a drain thereof to limit a current to protect the electrostatic protection transistor. In FIG. 4, an example in which the first transistor M1 and the third transistor M3 are N-type transistors and the second transistor M2 is a P-type transistor is used, but the present invention is not limited thereto. The first transistor M1 and the third transistor M3 may be P-type transistors, and the second transistor M2 may be an N-type transistor.

In some embodiments, there is an isolation circuit 1305 between the at least one second transistor M2 and the at least one corresponding third transistor M3, so that the at least one second transistor M2 blocks a current from the at least one corresponding third transistor M3 by using the corresponding isolation circuit 1305. The isolation circuit 1305 may be implemented by a diode. The diode may be, for example, a blocking diode. In some embodiments, the isolation circuit 1305 may be included in the power reception notification circuit 130 or the ESD protection circuit 120.

In some embodiments, a common contact between the first transistor M1 and the at least one second transistor M2 is coupled to an operating voltage terminal $V_{DD}$ and a starting resistor $R_D$, and the first transistor M1, when being turned on, deducts a voltage on the starting resistor $R_D$ from a voltage on the operating voltage terminal $V_{DD}$ to generate the first control voltage $V_{C1}$. The common contact between the first transistor M1 and the at least one second transistor M2 is a drain of the first transistor M1 and a gate of the second transistor M2. The starting resistor $R_D$ may have a large resistance value, so that when the first transistor M1 is turned on to be conducting, the drain of the first transistor M1 generates a low-level first control voltage $V_{C1}$, to turn on the second transistor M2 and enable the second transistor M2 to be conducting. The operating voltage terminal $V_{DD}$ may be a system voltage of a USB power delivery device 100. for example, a voltage from a battery of the USB power delivery device 100, a voltage from a power supply management circuit 150, a voltage from a direct power supply pin Vconn, or a voltage from a conversion power supply pin VBus.

In some embodiments, the at least one second transistor M2 is further coupled to an operating voltage terminal $V_{DD}$. The at least one second transistor M2, when being turned on, generates the second control voltage $V_{C2}$ according to a voltage from the operating voltage terminal $V_{DD}$. Specifically, a drain terminal of the second transistor M2 is coupled to the operating voltage terminal $V_{DD}$, and when the second transistor M2 is turned on to be conducting, the second transistor M2 subtracts a voltage of internal resistance between a source and a drain of the second transistor M2 from a voltage of the operating voltage terminal $V_{DD}$ at the drain terminal, to generate a second control voltage $V_{C2}$ at a source terminal of the second transistor M2, to further turn on the third transistor M3 and enable the third transistor to be conducting, thereby forming the pull-down path PDD. Because a resistance value of the internal resistance is generally small, when the second transistor M2 is turned on to be conducting, a voltage value of the second control voltage $V_{C2}$ that is generated at the source terminal is substantially the same as a voltage value of the operating voltage terminal $V_{DD}$.

In some embodiments, the ESD protection circuit 120 is configured to discharge, when the configuration channel pin CC has static electricity, the static electricity through the pull-down path PDD of the pull-down circuit 1203. In some embodiments, when the configuration channel pin CC has static electricity, the third transistor M3 is turned on by the static electricity, to form a pull-down path PDD, and discharges the static electricity through the pull-down path PDD. In some embodiments, there are capacitors C1 and C2 between the third transistor M3 and the configuration channel pin CC, so that when the configuration channel pin CC has static electricity, the pull-down path PDD of the pull-down circuit 1203 is turned on to discharge the static electricity. Specifically, when the configuration channel pin CC has static electricity, the static electricity charges the capacitors C1 and C2, to raise a gate voltage of the third transistor M3, to further enable the third transistor M3 to be turned on and conducting, so that the conducting third transistor M3 forms a pull-down path PDD, and discharges the static electricity of the configuration channel pin CC through the pull-down path PDD.

In some embodiments, the power reception notification circuit 130 and the ESD protection circuit 120 may further include another active or passive element (for example, a diode, an inductor, a capacitor, or a resistor), to add a function to the power reception notification circuit 130 and the ESD protection circuit 120. For example, an overload protection function or ESD protection assistance is added to the power reception notification circuit 130 and the ESD protection circuit 120.

Figure 5:
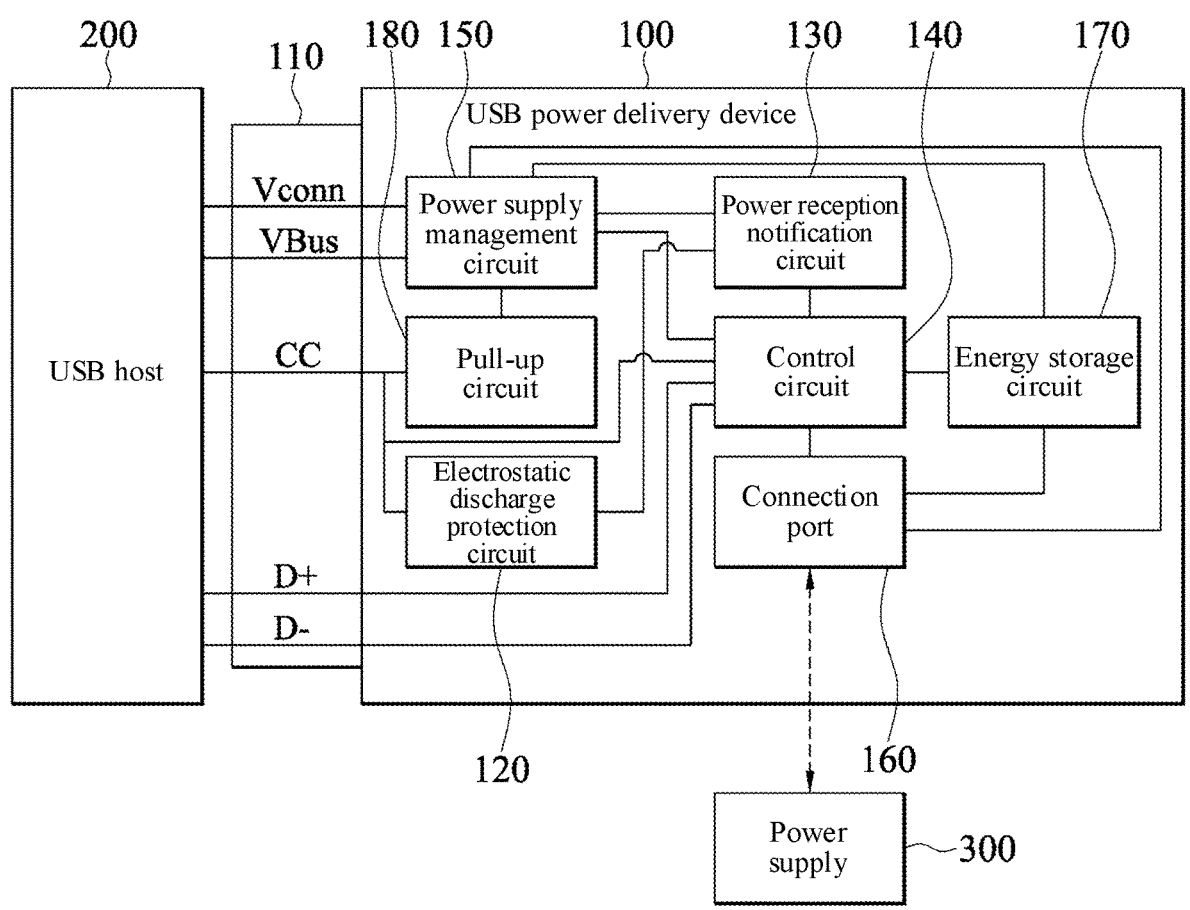
FIG. 5 illustrates a schematic block diagram of a USB power delivery device and a circuit applied thereto according to some embodiments.

FIG. 5 illustrates a schematic block diagram of a USB power delivery device 100 and a circuit applied thereto according to some embodiments. In some embodiments, the USB power delivery device 100 further includes a pull-up circuit 180. The pull-up circuit 180 is coupled to a configuration channel pin CC of a connector 110. A description is made by using an example in which the USB power delivery device 100 has been stably drawing power from the USB host 200. The control circuit 140 is configured to detect a trigger signal, and sends an enable signal to a power reception notification circuit 130 when the trigger signal meets a power supply condition. For example, the control circuit 140 detects a trigger signal periodically (for example, periodically performs detection according to a clock signal) or in real time, and when the trigger signal meets a power supply condition (for example, the trigger signal is generated because a power supply condition is met), that is, when the USB power delivery device 100 intends to switch from receiving power from the USB host 200 to supplying power to the USB host 200 (that is, perform an FRS function to switch from a power reception role to a power supply role), the control circuit 140 controls the configuration channel pin CC to generate a pull-up voltage through the pull-up circuit

180. Specifically, the configuration channel pin CC generates a pull-up voltage of a high voltage level by using a pull-up resistor $R_{PU}$ provided by the pull-up circuit 180, for the USB host 200 to learn that the USB power delivery device 100 intends to switch from receiving power from the USB host 200 to supplying power to the USB host 200, to perform a corresponding action (for example, the USB host 200 lowers the voltage level of the configuration channel pin CC, so that after learning that the USB host 200 can start to receive power, the USB power delivery device 100 starts to supply power for the USB host 200 to draw). The pull-up voltage is a high voltage level, for example, is close to or the same as a voltage value of the operating voltage terminal $V_{DD}$. The pull-up resistor $R_{PU}$ may be a resistor having a large resistance value, for example, a resistor greater than 1000 ohm. In some embodiments, the pull-up circuit 180 may be implemented by a circuit, including an active or passive electronic element such as a diode, an inductor, a capacitor, or a resistor and configured to pull up the voltage level in a case that a power supply condition is met. For example, the pull-up circuit 180 may be implemented by the pull-up resistor $R_{PU}$ and the operating voltage terminal $V_{DD}$ that are connected in series.

When the pull-up voltage of the connector 110 is less than a pull-up threshold, the control circuit 140 controls the connector 110 to output power for the USB host 200 to draw. For example, after the configuration channel pin CC generates the pull-up voltage, the control circuit 140 detects the voltage level of the configuration channel pin CC periodically (for example, periodically performs detection according to a clock signal) or in real time, and when the voltage level (that is, the pull-up voltage) of the configuration channel pin CC drops to be less than the pull-up threshold due to the USB host 200, controls the connector 110 to output power for the USB host 200 to draw. After learning that the USB power delivery device 100 intends to switch from receiving power from the USB host 200 to supplying power to the USB host 200, the USB host 200 lowers the voltage level of the configuration channel pin CC in an electrical connection, so that the control circuit 140 of the USB power delivery device 100 may determine, by detecting the voltage level of the configuration channel pin CC, whether the USB host 200 is ready to draw power, and when the voltage level of the configuration channel pin CC drops due to the USB host 200, determine that the USB host 200 is ready to draw power, and start to supply power for the USB host 200 to draw. The pull-up threshold may be determined according to a voltage value of the pull-up voltage that has not dropped due to the USB host 200. For example, when the pull-up voltage has not dropped and a voltage value thereof is 3.2 volts, the pull-up threshold may be 3.2 volts, but the present invention is not limited thereto.

In some embodiments, the configuration channel pin CC of the connector 110 lowers the pull-up voltage by using a pull-down signal from the USB host 200, to output, when the pull-up voltage is less than the pull-up threshold, power for the USB host 200 to draw. For example, after learning that the USB power delivery device 100 intends to switch from receiving power from the USB host 200 to supplying power to the USB host 200, the USB host 200 sends a signal having a low voltage level (that is, the pull-down signal), to lower the voltage level (that is, the pull-up voltage) of the configuration channel pin CC, and when the pull-up voltage is less than the pull-up threshold, the USB power delivery device 100 learns that the USB host 200 can start to receive power (for example, the control circuit 140 determines, according to a comparison result that is generated after a comparator (not shown) of the USB power delivery device 100 compares the pull-up voltage with the pull-up threshold, whether the USB host 200 can start to receive power, and learns that the USB host 200 can start to receive power when the comparison result is that the pull-up voltage is less than the pull-up threshold), and starts to supply power for the USB host 200 to draw.

In some embodiments, the power reception condition is that the trigger signal is a signal generated by the control circuit 140 when a pull-down signal sent from the USB host 200 is detected through the connector 110. For example, when the USB host 200 intends to switch from supplying power to the USB power delivery device 100 to drawing power from the USB power delivery device 100, or when the USB power delivery device 100 intends to switch from drawing power from the USB host 200 to supplying power to the USB host 200, the USB host 200 sends a pull-down signal (for example, a signal having a low voltage level) to lower the pull-up voltage of the USB power delivery device 100 or notify the USB power delivery device 100 that the USB host 200 intends to switch to a power reception role. When detecting a pull-down signal from the USB host 200 by using the configuration channel pin CC of the connector 110, the control circuit 140 generates a trigger signal.

In some embodiments, the USB power delivery device 100 further includes at least one connection port 160, where the power supply condition is that the trigger signal is a signal generated by the control circuit 140 when it is detected that the connection port 160 receives a power supply 300. For convenience of description, merely one connection port 160 is drawn in FIG. 5, but the present invention is not limited thereto. For example, the USB power delivery device 100 stably draws power from the USB host 200, and the power supply management circuit 150 manages the drawn power. When the USB power delivery device 100 detects that the connection port 160 receives a power supply 300 (for example, a state of a connection between the USB power delivery device 100 and the power supply 300 switches from an unconnected state to a connected state), the USB power delivery device 100 is enabled to draw power from the power supply 300. Therefore, the control circuit 140 generates a trigger signal, for the USB power delivery device to switch from drawing power from the USB host 200 to supplying power to the USB host 200.

In some embodiments, the USB power delivery device 100 further includes an energy storage circuit 170, where the power supply condition is that the trigger signal is a signal generated by the control circuit 140 when it is detected that remaining energy of the energy storage circuit 170 is greater than an energy threshold. For example, when the remaining energy of the energy storage circuit 170 is greater than an energy threshold, the USB power delivery device 100 is caused to have sufficient energy (that is, power) to supply to the USB host 200, so that the control circuit 140 generates a trigger signal (for example, the control circuit 140 determines, according to a comparison result of a comparator, whether the remaining energy is greater than the energy threshold, and generates a trigger signal when the remaining energy is greater than the energy threshold), to switch from drawing power from the USB host 200 to supplying power to the USB host 200. The energy threshold may be determined according to total stored energy of the energy storage circuit 170. For example, the energy threshold may be 90% of the total stored energy of the energy storage circuit 170.

Figure 6:
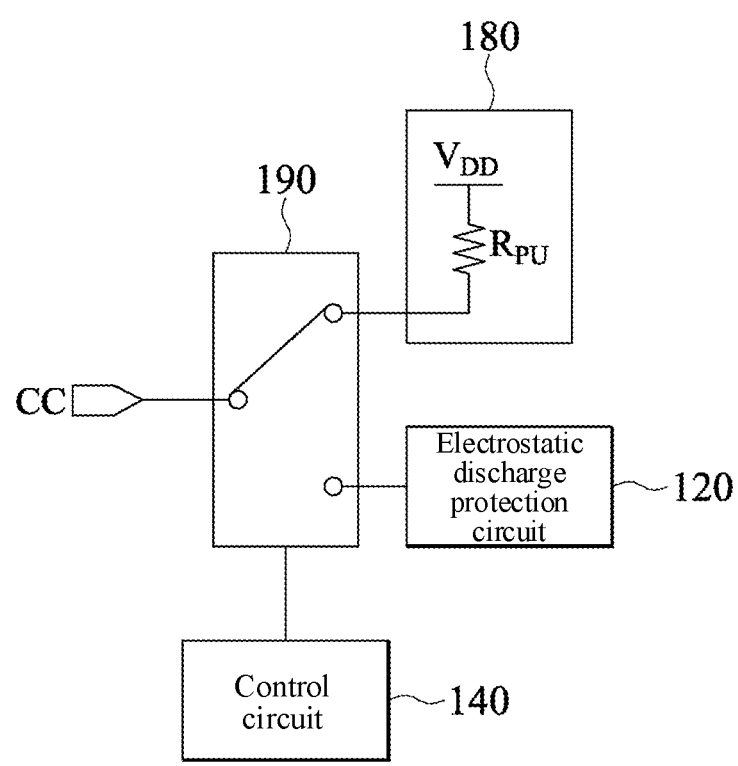
FIG. 6 illustrates a schematic block diagram of a circuit of a partial USB power delivery device according to some embodiments.

FIG. 6 illustrates a schematic block diagram of a circuit of a partial USB power delivery device 100 according to some embodiments. In some embodiments, a switching circuit 190 is coupled among a pull-up circuit 180, an ESD protection circuit 120, and a configuration channel pin CC. A control terminal of the switching circuit 190 is coupled to a control circuit 140. When detecting a trigger signal that meets a power reception condition, the control circuit 140 enables the switching circuit 190 through the control terminal to electrically connect the configuration channel pin CC to the ESD protection circuit 120, to enable the configuration channel pin CC to generate a pull-down voltage. When detecting a trigger signal that meets a power supply condition, the control circuit 140 enables the switching circuit 190 through the control terminal to electrically connect the configuration channel pin CC to the pull-up circuit 180, to enable the configuration channel pin CC to generate a pull-up voltage. In some embodiments, when a connector 110 is not connected to a device, a pin thereof (for example, the configuration channel pin CC) is likely to have static electricity. Therefore, when the connector 110 is not connected to a device, the control circuit 140 enables the switching circuit 190 through the control terminal to electrically connect the configuration channel pin CC to the ESD protection circuit 120, so that when the configuration channel pin CC has static electricity, the static electricity is discharged by the ESD protection circuit 120.

Based on the above, according to some embodiments, when a power reception condition is met (for example, when a power from a power supply is cut off or a connected electronic device intends to be a power supply device), the configuration channel pin generates a pull-down voltage through a pull-down path, of an ESD protection circuit, that does not need to be coupled to a plurality of resistors with large resistance values that are connected in parallel, so that when the pull-down voltage is raised due to the connected electronic device (for example, a USB host), a connector draws power from the USB host, to complete an FRS program. In addition, because the pull-down voltage used by the configuration channel pin for executing the FRS program is generated by the pull-down path of a common ESD protection circuit, a design area of a circuit board can be significantly reduced.

What is claimed is:

1. An electronic device having a universal serial bus (USB) power delivery function, comprising:
  a connector, coupled to a USB host, and comprising a configuration channel pin;
  an electrostatic discharge (ESD) protection circuit, coupled to the configuration channel pin of the connector;
  a power reception notification circuit, coupled to the ESD protection circuit, and configured to turn on, in response to an enable signal, a pull-down path of a pull-down circuit of the ESD protection circuit, wherein the configuration channel pin generates a pull-down voltage through the pull-down path of the pull-down circuit when the pull-down path is turned on; and
  a control circuit, coupled to the power reception notification circuit and the connector, and configured to send the enable signal to the power reception notification circuit when a trigger signal that meets a power reception condition is detected, wherein the control circuit controls the connector to draw power from the USB host when the pull-down voltage of the connector is greater than a pull-down threshold.

2. The electronic device having a USB power delivery function according to claim 1, wherein the power reception notification circuit comprises:
  a drive circuit, coupled to the pull-down circuit, and configured to turn on, when being enabled, the pull-down path of the pull-down circuit; and
  an enable terminal, coupled to the drive circuit and the control circuit, and configured to enable, in response to the enable signal, the drive circuit.

3. The electronic device having a USB power delivery function according to claim 2, wherein the drive circuit comprises:
  a first transistor, coupled to the enable terminal, and configured to generate a first control voltage when being enabled by the enable terminal and turned on; and
  at least one second transistor, coupled to the first transistor, and configured to generate a second control voltage when being turned on according to the first control voltage; and
  the pull-down circuit comprises:
  at least one third transistor, coupled to the configuration channel pin and the corresponding second transistor, and configured to be turned on according to the second control voltage, to form the pull-down path.

4. The electronic device having a USB power delivery function according to claim 3, wherein there is an isolation circuit between the at least one second transistor and the at least one corresponding third transistor, so that the at least one second transistor blocks a current from the at least one corresponding third transistor by using the corresponding isolation circuit.

5. The electronic device having a USB power delivery function according to claim 3, wherein a common contact between the first transistor and the at least one second transistor is coupled to an operating voltage terminal and a starting resistor, and the first transistor, when being turned on, deducts a voltage on the starting resistor from a voltage on the operating voltage terminal to generate the first control voltage.

6. The electronic device having a USB power delivery function according to claim 3, wherein the at least one second transistor is further coupled to an operating voltage terminal, and when being turned on, the at least one second transistor generates the second control voltage according to a voltage from the operating voltage terminal.

7. The electronic device having a USB power delivery function according to claim 1, wherein the ESD protection circuit is configured to discharge, when the configuration channel pin has static electricity, the static electricity through the pull-down path of the pull-down circuit.

8. The electronic device having a USB power delivery function according to claim 7, wherein the pull-down circuit comprises:
  at least one third transistor, coupled to the configuration channel pin, and configured to be, when the configuration channel pin has the static electricity, turned on to form the pull-down path and discharge the static electricity through the pull-down path.

9. The electronic device having a USB power delivery function according to claim 1, further comprising: a connection port, wherein the power reception condition is that the trigger signal is a signal generated by the control circuit when it is detected that the connection port is not receiving a power supply.

10. The electronic device having a USB power delivery function according to claim 1, wherein the power reception condition is that the trigger signal is a signal generated by the control circuit when a pull-up signal sent from the USB host is detected through the connector.

11. The electronic device having a USB power delivery function according to claim 1, further comprising: an energy storage circuit, wherein the power reception condition is that the trigger signal is a signal generated by the control circuit when it is detected that remaining energy of the energy storage circuit is less than an energy threshold.

12. The electronic device having a USB power delivery function according to claim 1, wherein the configuration channel pin of the connector raises the pull-down voltage by using a pull-up signal from the USB host, to draw the power from the USB host when the pull-down voltage is greater than the pull-down threshold.

13. The electronic device having a USB power delivery function according to claim 1, further comprising: a pull-up circuit, coupled to the configuration channel pin of the connector, wherein when the trigger signal that meets a power supply condition is detected, the control circuit controls the configuration channel pin to generate a pull-up voltage through the pull-up circuit, and when the pull-up voltage of the connector is less than a pull-up threshold, the control circuit controls the connector to output the power, for the USB host to draw.

14. The electronic device having a USB power delivery function according to claim 13, further comprising: a connection port, wherein the power supply condition is that the trigger signal is a signal generated by the control circuit when it is detected that the connection port is receiving a power supply.

15. The electronic device having a USB power delivery function according to claim 13, wherein the power supply condition is that the trigger signal is a signal generated by the control circuit when a pull-down signal sent from the USB host is detected through the connector.

16. The electronic device having a USB power delivery function according to claim 13, further comprising: an energy storage circuit, wherein the power supply condition is that the trigger signal is a signal generated by the control circuit when it is detected that remaining energy of the energy storage circuit is greater than an energy threshold.

17. The electronic device having a USB power delivery function according to claim 13, wherein the configuration channel pin of the connector lowers the pull-up voltage by using a pull-down signal from the USB host, to output the power for the USB host to draw when the pull-up voltage is less than the pull-up threshold.

* * * * *